US007567239B2

(12) United States Patent
Seni (10) Patent No.: US 7,567,239 B2
(45) Date of Patent: *Jul. 28, 2009

(54) METHOD AND SYSTEM FOR MESSAGE AND NOTE COMPOSITION ON SMALL SCREEN DEVICES

(75) Inventor: Giovanni Seni, Mountain View, CA (US)

(73) Assignee: Motorola, Inc., Schaumburg, IL (US)

( * ) Notice: Subject to any disclaimer, the term of this patent is extended or adjusted under 35 U.S.C. 154(b) by 630 days.

This patent is subject to a terminal disclaimer.

(21) Appl. No.: 10/606,423

(22) Filed: Jun. 26, 2003

(65) Prior Publication Data

US 2004/0263486 A1 Dec. 30, 2004

(51) Int. Cl.
G06F 3/041 (2006.01)
G06F 3/033 (2006.01)
(52) U.S. Cl. ...................................... 345/173; 345/179
(58) Field of Classification Search ................. 345/173, 345/179; 382/189; 715/539
See application file for complete search history.

(56) References Cited

U.S. PATENT DOCUMENTS

| 4,972,496 A | 11/1990 | Sklarew |
| 4,974,260 A | 11/1990 | Rudak |
| 5,367,453 A | 11/1994 | Capps et al. |
| 5,455,901 A | 10/1995 | Friend et al. |
| 5,500,937 A | 3/1996 | Thompson-Rohrlich |
| 5,596,350 A | 1/1997 | Capps et al. |
| 5,680,480 A | 10/1997 | Beernink et al. |
| 5,682,439 A | 10/1997 | Beernink et al. |
| 5,698,822 A * | 12/1997 | Haneda et al. ............... 345/173 |
| 5,710,832 A | 1/1998 | Berman et al. |
| 5,734,749 A | 3/1998 | Yamada et al. |
| 5,745,716 A | 4/1998 | Tchao et al. |
| 5,754,686 A | 5/1998 | Harada et al. |
| 5,778,404 A | 7/1998 | Capps et al. |
| 5,812,696 A | 9/1998 | Arai et al. |

(Continued)

FOREIGN PATENT DOCUMENTS

WO   WO 9410678 A1 * 5/1994

(Continued)

OTHER PUBLICATIONS

Giovanni Seni, Motorola Human Interface labs, Mountain View, California, "TreadMill Ink—Enabling Continuous Pen Input on Small Devices," Presented at IWFHR 2002, Ontario, Canada, Aug. 6-8, 2002.

Primary Examiner—Sumati Lefkowitz
Assistant Examiner—William L Boddie (57) ABSTRACT

A method and system for written input and subsequent display of said written input of an electronic device (100). The electronic device (100) has a touch input screen (104), said touch input screen operable to accept written input, a display element (105), said display element (105) operable to display one or more of recognized text and digital ink. The recognized text is determined from the written input using a recognition feature coupled to the touch input screen (104) while the digital ink corresponds to the written input. The digital ink may be edited by the user. A scrolling mechanism is coupled to the touch input screen (104) that enables at least a portion of the touch input screen (104) to appear to move as written entries are input thereon so as to continuously present screen space on the touch input screen (104) to the user for written input.

8 Claims, 5 Drawing Sheets

U.S. PATENT DOCUMENTS

| | | | |
|---|---|---|---|
| 5,838,302 A * | 11/1998 | Kuriyama et al. | 345/173 |
| 5,870,492 A | 2/1999 | Shimizu et al. | |
| 5,881,169 A | 3/1999 | Henry, Jr. | |
| 5,889,888 A | 3/1999 | Marianetti, II et al. | |
| 5,911,013 A | 6/1999 | Taniishi | |
| 5,917,493 A * | 6/1999 | Tan et al. | 715/539 |
| 5,926,566 A | 7/1999 | Wang et al. | |
| 5,953,541 A | 9/1999 | King et al. | |
| 5,956,021 A | 9/1999 | Kubota et al. | |
| 5,974,161 A | 10/1999 | York | |
| 6,005,973 A | 12/1999 | Seybold et al. | |
| 6,011,554 A | 1/2000 | King et al. | |
| 6,035,062 A | 3/2000 | Takasu et al. | |
| 6,052,482 A | 4/2000 | Arai et al. | |
| 6,169,538 B1 | 1/2001 | Nowlan et al. | |
| 6,188,789 B1 | 2/2001 | Marianetti, II et al. | |
| 6,256,009 B1 * | 7/2001 | Lui et al. | 345/173 |
| 6,275,612 B1 | 8/2001 | Imoto | |
| 6,295,372 B1 | 9/2001 | Hawkins et al. | |
| 6,370,282 B1 | 4/2002 | Pavley et al. | |
| 6,418,239 B1 | 7/2002 | Hullender et al. | |
| 6,512,525 B1 | 1/2003 | Capps et al. | |
| 6,642,458 B2 | 11/2003 | Panagrossi, III et al. | |
| 6,661,409 B2 * | 12/2003 | Demartines et al. | 345/173 |
| 6,661,920 B1 | 12/2003 | Skinner | |
| 6,664,991 B1 | 12/2003 | Chew et al. | |
| 6,671,170 B2 | 12/2003 | Webb et al. | |
| 6,683,600 B1 | 1/2004 | Lui | |
| 6,690,364 B1 | 2/2004 | Webb | |
| 6,697,639 B2 | 2/2004 | Andress | |
| 6,704,006 B2 | 3/2004 | Cherry et al. | |
| 6,707,942 B1 | 3/2004 | Cortopassi et al. | |
| 6,724,370 B2 | 4/2004 | Dutta et al. | |
| 6,734,881 B1 | 5/2004 | Will | |
| 6,751,605 B2 | 6/2004 | Gunji et al. | |
| 6,791,537 B1 | 9/2004 | Shim et al. | |
| 2003/0007018 A1 | 1/2003 | Seni et al. | |
| 2003/0016873 A1 | 1/2003 | Nagel et al. | |

FOREIGN PATENT DOCUMENTS

| | | | |
|---|---|---|---|
| WO | WO 03/019522 A1 | 3/2003 | |

* cited by examiner

METHOD AND SYSTEM FOR MESSAGE AND NOTE COMPOSITION ON SMALL SCREEN DEVICES

CROSS REFERENCE TO RELATED APPLICATIONS

The present invention is related to U.S. patent application Ser. No. 09/901,878 entitled "Handwriting User Interface for Personal Digital Assistants and the Like" to Seni et al., assigned to the assignee of the present invention, filed Jul. 9, 2001 and published as US-2003-0007018-A1 on Jan. 9, 2003; to U.S. patent application Ser. No. 09/938,319 entitled "Automatically Scrolling Handwritten Input User Interface for Personal Digital Assistants and the Like" to Demartines et al., assigned to the assignee of the present invention, filed Aug. 22, 2001, and published as US-2003-0038788-A1; and U.S. patent application Ser. No. 09/909,202 entitled "Text Input Method for Personal Digital Assistants and the Like" to Nagel et al., assigned to the assignee of the present invention, filed Jul. 19, 2001 and published as US-2003-0016873-A1 on Jan. 23, 2003. These applications are herein incorporated by reference.

TECHNICAL FIELD

This invention relates to written message and note composition on small screen sized devices and more specifically to methods and systems for digital ink message and note composition on small screen sized devices, such as mobile devices or personal digital assistants ("PDAs").

BACKGROUND OF THE INVENTION

Small, touch-enabled, screen devices, such as mobile cellular telephones and personal digital assistants ("PDAs"), are increasing in popularity. A typical small, touch-enabled, screen device is a limited function microcomputer provided with a pressure sensitive liquid crystal diode (LCD) display (a touch pad or a touch screen) for input and output (I/O). Small screen devices are useful for many purposes including voice and wireless Internet communication, scheduling, and note taking. Often the primary input means for these small screen devices is via the pressure sensitive LCD display with a limited-size keypad. As these portable devices become smaller and more specialized, continuous written input has become more difficult and less practical. Pen-based user interfaces are attractive because they are scalable (i.e., only small reductions in size can be made to keyboards before they become awkward to use) and offer the pointing capabilities of a touch-screen or mouse. Furthermore, when compared to voice-based interfaces, pen-based input takes place in private, in silence without disturbing bystanders, and is insensitive to acoustic noise in the environment.

Manual input on small screen devices, such as mobile cellular telephones and personal digital assistants ("PDA") generally consists of one or more "ink traces" for user input. As is known in the art, an ink point is an element in the stream of data recorded by a real-time digitizer of writing and a trace is a sequence of contiguous ink points. An ink trace is a complete pen-down movement bounded by two pen-up movements or a complete pen-up movement. A sequence of traces accumulates to meaningful units, such as characters and words.

Because of the limited size of the screen relative to the size of the written input, there are inherent complications associated with the physical size of the input area on small screen devices. For small screen sized devices such as of PDAs, input interfaces often referred to as write-anywhere user interfaces allow users to write two or three lines at a time where each line may only contain two or three words. This limited word entry capability limits the realistic volume of writing and prevents continuous uninterrupted longhand entry. Further, these write-anywhere interfaces are problematic because it is difficult to differentiate whether the stylus is acting as a pointer, for clicking on application icons and the like, or an inking instrument for text entry. A common solution involves an un-natural "tap and hold" scheme wherein the pen has to be maintained down without dragging it for a certain amount of time in order to get the stylus to act temporarily as a mouse. This can lead to text input errors and the attendant aggravation and input delays caused by such errors.

In the prior art there exists several options to increase the writing space available: the user can manually scroll the writing area, the application can automatically scroll up the writing area when ink traces are detected at the bottom of the screen, or the application can convert the ink traces into a scaled down representation that clears part of the writing area. Each of the current prior art options has problems associated with them that require interruptions in the writing input. Manually scrolling the input area requires the user to move the cursor away from the input area and to a scroll bar or equivalent movement area to manually scroll the writing area. Automatically scrolling by an application detecting ink traces at the bottom of the screen requires interruptions during the detection and scrolling process. Finally, automatically converting the ink traces into a scaled down representation requires interruptions during the conversion process since a portion of the writing area is cleared.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 1:
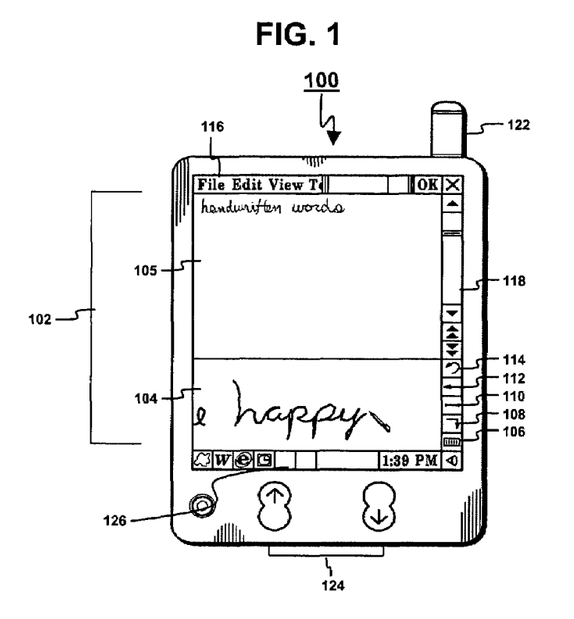
FIG. 1 is a first plan view of a handheld device in accordance with certain embodiments of the invention showing a graphical handwriting user interface having a continuously scrolling text screen area.

Referring to FIG. 1 a first plan view of a handheld device 100 in accordance with certain embodiments of the invention showing a graphical handwriting user interface having a continuously scrolling written text input screen area is shown. The handheld device has a graphical handwriting user interface 102 in accordance with certain embodiments of the invention. A lower portion of the display is designated handwriting input area 104 with the area 105 thereabove used for displaying, in a digital ink format, the text that is input in area 104, as well as for other features of the various applications the device incorporates. Action icons 106, 108, 110, 112 and 114 are disposed at a right side of the handwriting user interface 102. Action icons 126 are disposed at a bottom side of handwriting user interface 102. Action icons 106, 108, 110, 112, 114, and action icons 126 may include one or more of a clock, menu toggle button, keyboard display icon, undo icon, backspace icon, spacebar icon, cursor icon, and new line icon. Digital ink text is displayed in the screen area 105 between a file management tool bar 116 and the handwriting input area 104. In this embodiment, a scroll bar 118 is disposed at the right side of the interface display 112. As written text is entered, the entry is displayed contemporaneously in the input area 104 as can be seen in FIG. 1. Effectively the user is provided with a writing area that is continuously moving from right to left. It is noted that the terms "handwriting" and "handheld" device are generic and as such also apply to situations in which a user is unable to hold the device or in situations in which handwriting is not possible, for example in the case a paralysis a user may provide input using a mouth pen and in the case of a fixed mounted unit the user may be required to access the device without direct handling.

Word demarcation may be done, simply, by one or more spaces or other special characters, intentionally or implicitly inserted between a current word and a next word. In certain embodiments of the present invention, a vertical word separator line (a word demarcation for signaling the end of one word and the beginning of a next word) may be selectively displayed. Provided input continues to the left of the word separator line, the current word is continued. Otherwise, if input continues to the right of the word separator line, a word break is indicated and a new word is begun. It is noted that a position of the word separator is not fixed. In certain embodiments of the present invention the word separator line is displayed to the right of the current point, and only when the pen is lifted.

Figure 2:
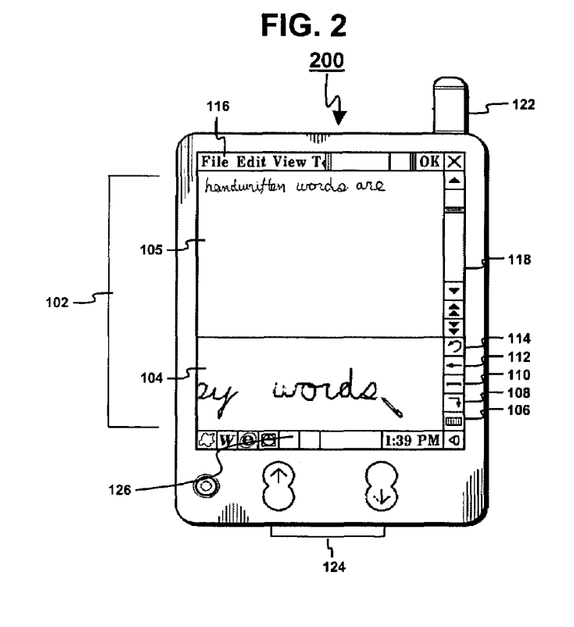
FIG. 2 is a second plan view of a handheld device in accordance with certain embodiments of the invention showing a graphical handwriting user interface having a continuously scrolling handwritten text input screen area.

As the user writes, the written input trails off to the left on the virtual ticker tape, as can be seen by referring exemplary handwriting input area 104 of second plan view 200 of FIG. 2. Accordingly, as the user is writing the entries such as those in the illustrated word "happy," the word will be shifted so that it gradually is removed from the input area 104 as by trailing off, e.g., off from the right to the left side. Also, the word separator line 120, if included and used, likewise trails off to the left edge of the input area 104 and remains there until entry resumes for the next word, "words" in this example. Otherwise, if the word separator line 120 is not used/included, the current word may trail off with a next word begun by allowing a sufficient gap between the current word and the new entry such that the gap could be recognized as a space. Alternately, a special character or a special space character may be included to signify a word break. By virtue of each word trailing off and being removed from the input area, the user is presented with substantially unlimited writing space in the normally space-constrained input area 104. It is noted that written input may be removed by trailing off from the right to the left side or from the left to the right side of input area 104 without departing from the spirit and scope of the present invention. It is also noted that input area 104 and screen area 105 may be oriented so that a long axis of input area 104 is vertical thereby accommodating languages in which characters are entered from top to bottom or bottom to top without departing from the spirit and scope of the present invention.

The device 100 may include a communications function and, to that end in this embodiment, an antenna 122 is shown at the top of the device 100. Individual function switches, buttons and other controls are disposed about the device, as is deemed appropriate for the particular device. The device 100 may also include an expansion port 124 or an expansion port function may be provided wirelessly through antenna 122. In certain embodiments of the present invention, the device 100 runs under a state of the art operating system for such handheld devices, e.g. Windows®) CE from Microsoft Corporation, Epoc® from Symbian or the Palm OS® from Palm, Inc.

The Handwritten Input User Interface (HIUI) of the present invention may be employed with a handwriting recognition engine capable of recognizing handwritten text, continuously input using any combination of writing styles. Alternatively, the HIUI may be employed with an ink only mode in which the text that is entered into input area 104 is directly displayed, after appropriate scaling and formatting, as digital ink in screen area 105 without any form of handwriting recognition performed. It is noted that the method of handling entered text may incorporate one or more of handwriting recognition or ink only display. The ink only display method may be viewed as a form of jotting down a note in certain embodiments of the present invention. The user is not restricted to cursive entry, nor is each entry delineated by a pause or by a time out between entries. Handwritten input may be provided in cursive (i.e., contiguous characters in each entry touching or connected), pure print (i.e., characters in every entry disconnected and not touching), pseudo-print (at most, pairs of characters in entries touch) or any combination thereof. In certain embodiments of the present invention, the user is operable to determine a color, line thickness, and font size of the entered text. These display preferences may be set, for example, in one or more user interfaces accessible from the graphical handwriting user interface 102. It is further noted that certain embodiments of the present invention allow the user to insert print characters within the written input of the screen area 105 further comprising activating a keyboard, said keyboard operable to be used to enter alphanumeric characters intermingled with the written input.

The recognition engine includes a main dictionary and may also include a user dictionary to which the user may add words to supplement the main dictionary. While using text recognition mode and while in a sentence or continuous mode, the recognition engine automatically separates or brackets each word as it is entered, using spaces, special characters or word separator line to bracket individual separate words. The recognition engine takes each individual word on the fly, and compares that handwritten input word against all words contained in the main dictionary and the user dictionary. A probability score is generated by the recognition engine for each dictionary word that is indicative of the likelihood that the handwritten entry matches that particular dictionary word. Based on each word's probability score, a list of likely matches is collected. When a pen trace falls out of the visible window area, the recognizer is invoked to buffer or recognize the ink. That is, the recognizer may, or may not, return a result at that time. At the very end of writing (say after a time-out), the recognition engine is requested to process any buffered ink for which no recognition result has been returned.

Figure 3:
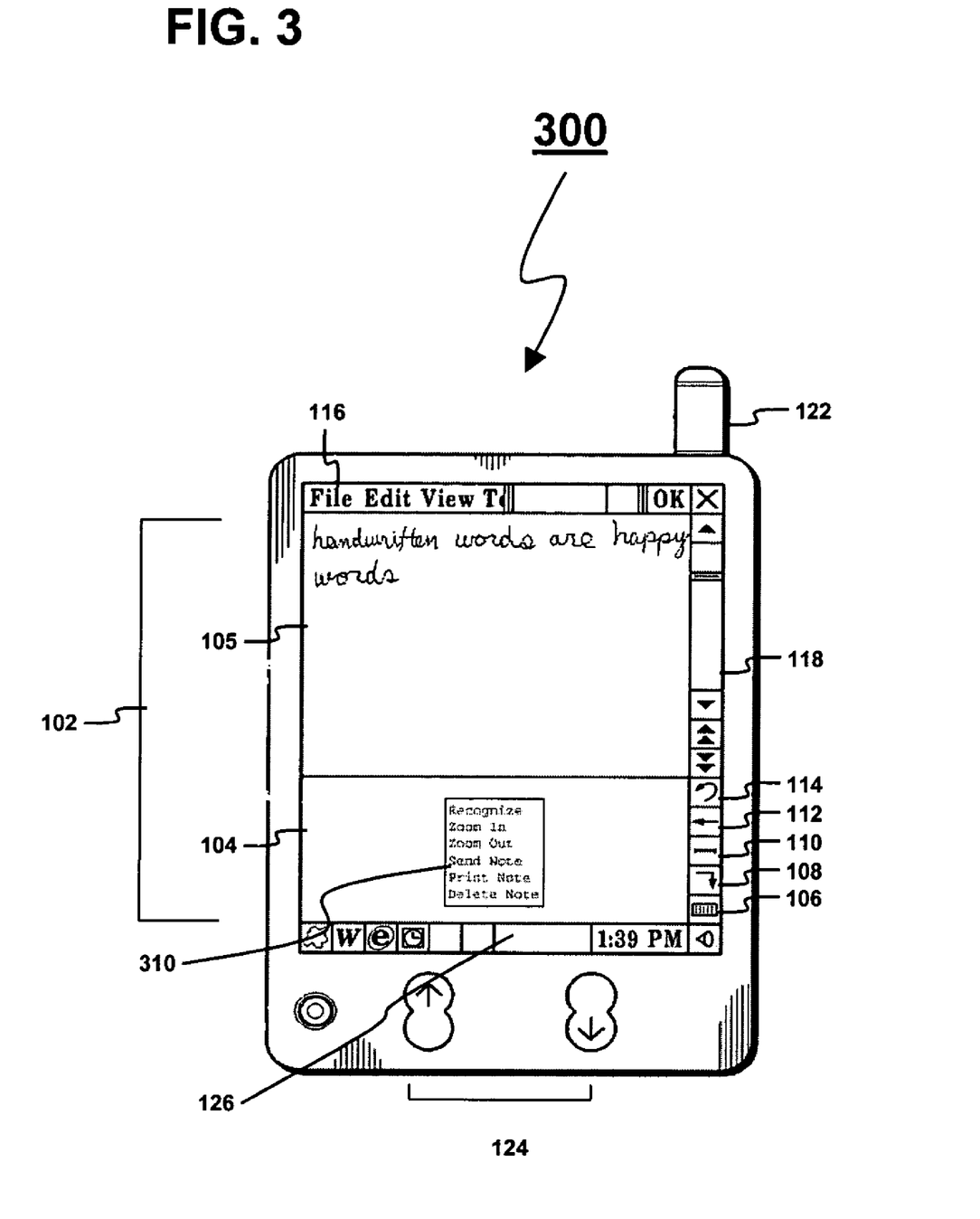
FIG. 3 is a third plan view of a handheld device in accordance with certain embodiments of the invention, wherein the third plan view illustrates a menu that provides the user with digital ink options.

Referring now to FIG. 3 a third plan view 300 of a handheld device is shown in accordance with certain embodiments of the invention, wherein the third plan view illustrates a menu that provides the user with digital ink options. The third plan view is substantially similar to the first plan view with the addition of menu 310. Menu 310 may be used while in ink only mode to perform one or more operations on the digital ink. It is noted that these operations may include one or more of: sending the digital ink electronically to a remote destination, printing the digital ink, erasing the digital ink from the screen area 105, viewing the digital ink at a greater or lesser degree of resolution, or applying the recognition engine to the digital ink. The user may apply the stylus to the menu 310 to make a choice from the menu 310. In certain embodiments of the present invention, the display of menu 310 may be selectively toggled using a menu button coupled to the handwriting user interface 102.

Figure 4:
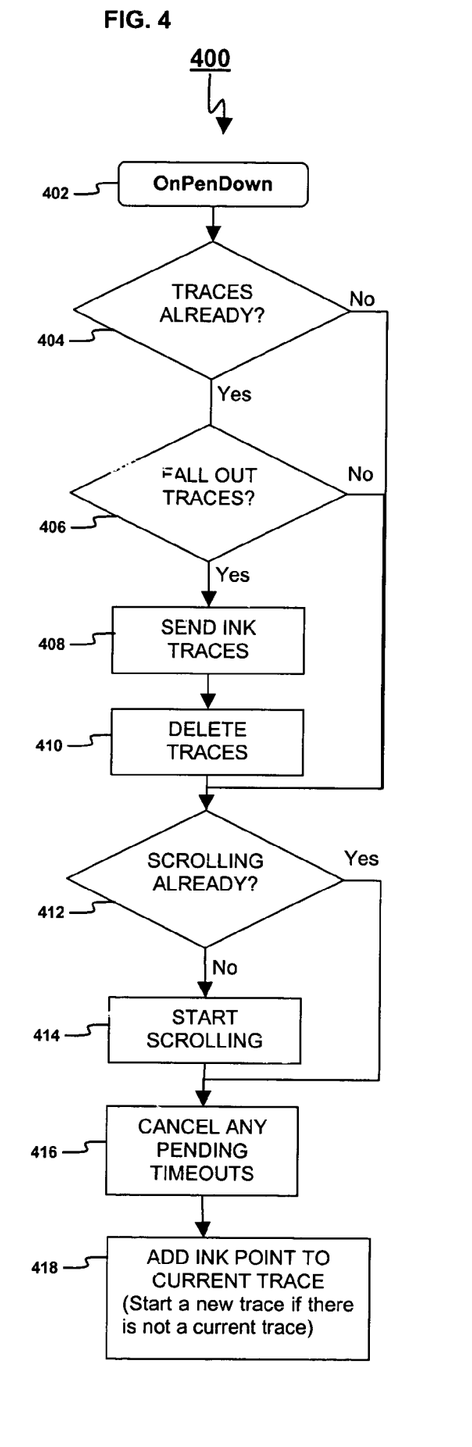
FIG. 4 is a flow diagram for handling pen down events using a conveyor ink technique for user input in accordance with certain embodiments of the invention.

Referring now to FIG. 4 a flow diagram for handling pen down events 400 using a conveyor ink technique for user input is shown in accordance with certain embodiments of the invention. The flow diagram 400 illustrates how handheld device 100 operates when the user touches input area 104 with a stylus. When a penDown event occurs (block 402), handheld device 100 first determines whether traces are already present in input area 104 (block 402). If traces are present and these traces have substantially fallen off an edge of input area 104 (yes in block 406), then these ink traces are sent directly to an ink processor for display in screen area 105 (block 408) and are then deleted from input area 104 (block 410). If there are no traces present in input area 104 or traces are present but have not yet fallen off the edge of input area 104 (no in block 404 or no in block 406), then the input area is checked for scrolling (block 412). If input area 104 is not yet scrolling, then scrolling is started (block 414), and in either case of scrolling or not scrolling any pending timeouts are canceled (block 416). An ink point is then drawn in the input area 104 and added to the current trace if there is a current trace. If there is not a current trace, then a new trace is started (block 418). The timeouts may be used to detect a presence or absence of activity in input area 104 to stop scrolling. In certain embodiments of the present invention, the user may control the duration of the timeouts.

Figure 5:
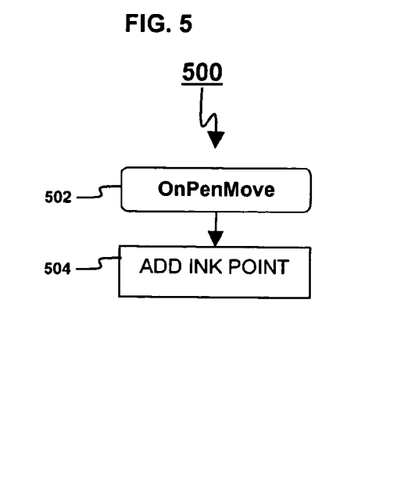
FIG. 5 is a flow diagram for handling pen move events using a conveyor ink technique for user input in accordance with certain embodiments of the invention.

Referring now to FIG. 5 a flow diagram for handling pen move events 500 using a conveyor ink technique for user input is shown in accordance with certain embodiments of the invention. On receiving a penMove event (block 502), an ink point is added to input area 104 (block 504) and to the current trace.

Figure 6:
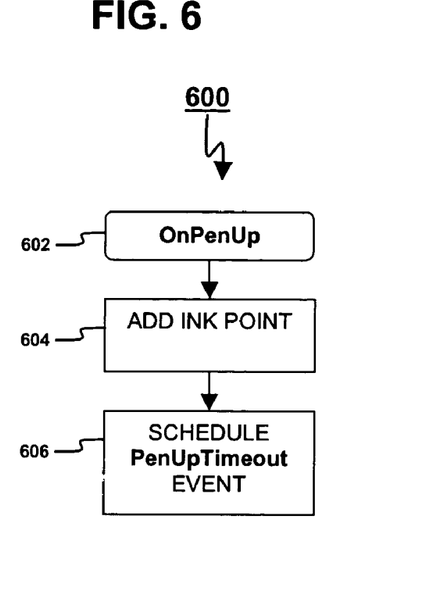
FIG. 6 is a flow diagram for handling pen up events using a conveyor ink technique for user input in accordance with certain embodiments of the invention.

Referring now to FIG. 6 a flow diagram for handling pen up events 600 using a conveyor ink technique for user input is shown in accordance with certain embodiments of the invention. On receiving a penUp event (block 602), an ink point is added to input area 104 (block 604) and to the current trace. This terminates the current trace. A penUpTimeout event 606 is then scheduled as in block 606. The penUpTimeout can then be used to determine how handheld device 100 processes a lack of activity in input area 104. The penUpTimeout may be reset when stylus activity is recorded in input area 104 as in the penDown event of FIG. 4.

Figure 7:
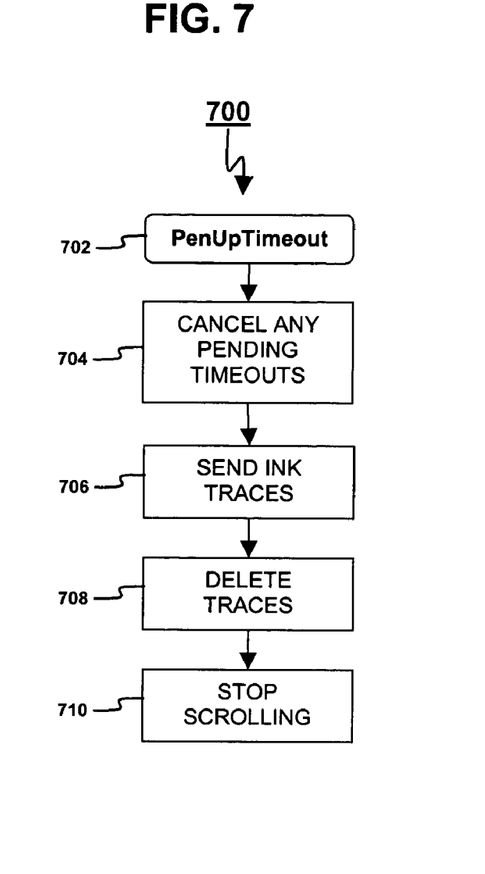
FIG. 7 is a flow diagram for handling pen up timeout events using a conveyor ink technique for user input in accordance with certain embodiments of the invention.

Referring now to FIG. 7 a flow diagram for handling penUpTimeout events 700 using a conveyor ink technique for user input is shown in accordance with certain embodiments of the invention. When a penUpTimeout event becomes active (block 702), indicating a specified amount of time has passed since any occurrence of user activity in input area 104, any pending timeouts are canceled (block 704) and ink traces present in input area 104 are sent to an ink processor for display in the screen area 105 (block 706). In certain embodiments of the present invention, a length of penUp Timeouts may be set by the user. The ink traces are then deleted from input area 104 (block 708), and scrolling of input area 104 is stopped (block 710).

Figure 8:
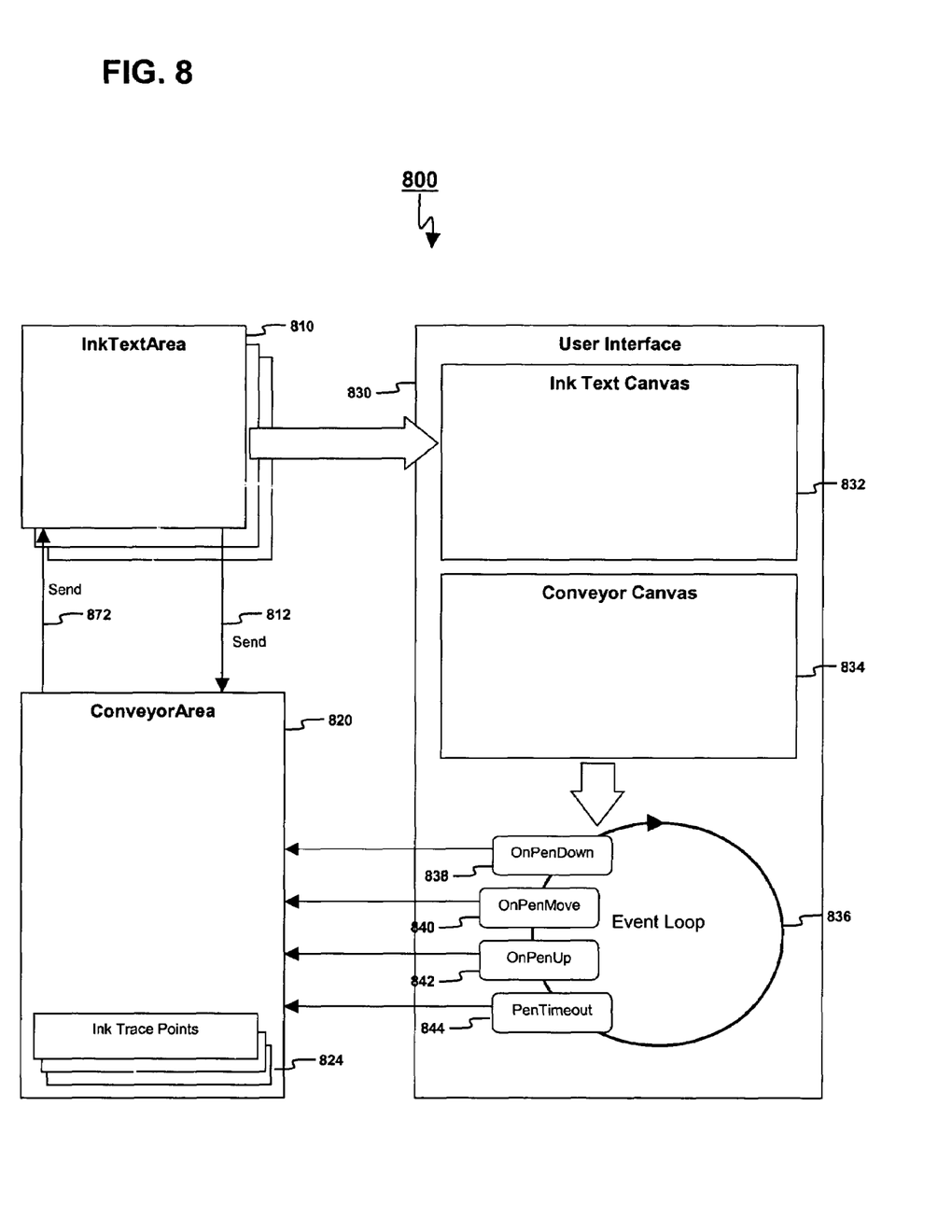
FIG. 8 is a system diagram for receiving continuous handwritten input using a conveyor ink technique for user input in accordance with certain embodiments of the invention.

Referring now to FIG. 8 a system diagram 800 for receiving continuous handwritten input using a conveyor ink technique for user input is shown in accordance with certain embodiments of the invention. The system diagram 800 illustrates how stylus motion events represented as penDown, penUp, PenMove, and PenUpTimeout events are handled from a functional point of view by handheld device 100.

The Conveyor Ink user interface 830 is a handwriting input user interface for continuous text input within a very small writing space, such as small portable devices with a touch-enabled screen. The Conveyor Ink user interface 830 includes an input area 104 on the device 100 that behaves as a conveyor such that electronic ink input is immediately moved from right to left while it is being entered, giving the user the feeling of writing text on a virtual ticker-tape. This allows the user to write continuously and indefinitely with minimal hand movement and writing space. The user is able to write continuously and indefinitely without the interruption of clearing or scrolling the input area 104, thereby increasing the text input speed of the user. It is noted that in certain embodiments of the present invention, a rate of scrolling of input area 104 may be set by the user. The rate of scrolling may be set so that users with differing rates of text input can write continuously in input area 104. It is further noted that in certain embodiments of the present invention, a user may opt to draw without having the input area scroll. This may be accomplished, for example, by the user entering a pause mode by pressing a user interface button, wherein said pause mode is operable to prevent input area 104 from scrolling. The user can then draw within input area 104, and after the user finishes drawing, exiting the pause mode whereby what was drawn is placed in the screen area 105. The ability to pause the scrolling of input area 104 may be useful, for example, when the user wishes to draw a picture, figure, equation, or even enter text more legibly.

In a traditional pen-and-paper experience, users handwrite by moving the hand and arm across the writing surface. For example, Latin based text input requires the user to move the hand from left to right, and from top to bottom if necessary, across the writing surface. With the conveyor ink, the user's arm does not move, but instead the writing surface scrolls the appropriate direction, such as from right to left for Latin based text input. Thus, the user never runs out of writing space.

The Conveyor Ink user interface 830 utilizes two non-blocking cooperating processes, an ink collection process and an ink processing process, to handle and process user input. The ink collection process is responsible for user input in input area 104 while the ink processing process is responsible for recognition or conversion to ink-text and the display of text in screen area 105 in ink only mode. While the collection process is collecting ink traces and without interruption the collected ink is regularly passed from the collection process to the ink processing process for recognition and display in screen area 105 or for display as digital ink in screen area 105.

How often ink is passed for ink processing reflects a compromise between two conflicting goals: returning results to the user as often as possible and buffering enough ink together to make processing meaningful (e.g., recognition of a single ink point might not make much sense). In certain embodiments of the present invention, a criterion is to pass pen traces to the ink processor as they fall out of the visible writing area. A trace is a sequence of ink points bounded by pen-up points.

The core functionality of the collection process of scrolling and collecting ink traces is handled in ConveyorArea 820. The ConveyorArea 820 handles the collection and display of ink traces in a conveyor canvas 834.

The core functionality of the ink processing process of converting input ink traces into ink-text is handled in InkTextArea 810. The InkTextArea 810 handles the scaling and segmentation of the handwritten ink for display as ink-text in screen area 105. The InkTextArea 810 is coupled with the ConveyorArea 820 to allow users to write big, without interruption, in the automatically scrolling input conveyor canvas 834, and read small, and possibly edit, in the ink-text canvas 832.

Conveyor ink user interface 830 of handheld device 100 comprises an ink text canvas 832 and conveyor canvas 834. Conveyor canvas 834 registers events with event loop 836 and event loop 836 interacts with conveyor area 820 in order to control display of text to input area 104. Conveyor area 820 and one or more ink traces 824 operable to be coupled to conveyor area 820 interact with InkTextArea 810 to display ink traces 824 in ink Text Canvas 832. Ink Text Canvas 832 is coupled to screen area 105. Ink traces 824 and conveyor area 820 interact with input area 104 to display results of stylus motion events in input area 104.

Note that InkTextArea 810 is operable to send 812 and receive 872 actions to conveyor area 820. Such actions may include size and positioning of displayed text in screen area 105, as well as text recognition functions, which may be performed in text in screen area 105 as for example under menu 310.

It is noted that in certain embodiments of the present invention, the InkTextArea object 810 might not be able to draw the digital ink directly. An inter-process communication framework, available in the implementation platform of choice, will dictate whether or not this is possible. As a first example, in an environment supporting a "lightweight" process model, the ConveyorArea 820 and the InkTextArea 810 can be separate threads of a process with shared memory between them. In this case, the Conveyor canvas 834 and the ink-text canvas 832 can be subwindows of a same parent window. This is operable to enable the InkTextArea object 810 to draw the digital ink directly.

As a second example, in a "heavyweight" process model, there is no shared memory with other processes and there is only one thread in each process. In this case the InkTextArea object 810 would need to send back the digital ink to the process containing the ConveyorArea 820 and have the display of the digital ink handled there.

In certain embodiments of the present invention, conversion of written input to digital ink involves two steps: scaling and segmenting the written input into lines so that it can be displayed vertically. In certain embodiments, traces, which after scaling are wider than the canvas width, are broken into sub-traces. Single point traces may be augmented with one or more dummy points to facilitate drawing. Note that in certain embodiments of the present invention, this segmentation is done without analysis of the gaps between traces for possible word boundary identification.

The event loop 836 handles, but is not limited to, one or more of onPenDown 838, OnPenMove 840, OnPenUp 842, and PenTimeout 844 events. As an example, depending upon the capabilities of handheld device 100, event loop may also respond to pen down events in specific geographic regions of input area 104, or may respond to multiple taps of a stylus in input area 104 with customized behavior without departing from the spirit and scope of the present invention. This customized behavior may include performing text recognition on input text, or may include any of the features of menu 310. It is also noted that in certain embodiments of the present invention, event loop may respond to actions that include varying a force with which the stylus is in contact with input area 104.

It is also noted that in certain embodiments of the present invention, a capability may be present in which handheld device 100 is operable to toggle between ink only mode characterized by the flow diagrams of FIG. 4-7 and text recognition mode. Such a toggle operation may be activated from one or more of menu 116, menu 310 or additional events within input area 104 such as double tapping input area 104 with a stylus. This toggling may be usable for example, in signing a note or letter to provide a certain amount of authentication or in providing a rough drawing of an object. It is also noted that in certain embodiments of the present invention, the user can place a cursor for digital ink modification in the display area. The digital ink modification or editing may comprise one or more of deleting one or more portions of ink traces of the digital ink, inserting one or more spaces between ink traces of the digital ink, inserting one or more new lines within the ink traces of the digital ink, or removing one or more spaces between ink traces of the digital ink. If the user wishes to delete one or more portions of the ink traces, then the user may place a cursor for digital ink modification in the display area and delete a portion of an ink trace using a delete key. If the user wishes to insert one or more spaces within the ink traces, then the user may place a cursor for digital ink modification in the display area and insert one or more spaces within an ink trace using an insert key. Similarly, a user can remove one or more spaces between ink traces by placing a cursor for digital ink modification in the display area between two ink traces and deleting a portion of a gap between the two ink traces using a delete key.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A handwritten input user interface (HIUI) for a portable device having a touch-enabled input screen, the HIUI comprising:
   a handwriting input area residing in a predetermined portion of the touch-enabled input screen, handwritten text being entered using a stylus;
   an input/display scrolling window in the handwriting input area, written entries being scrolled such that writing space is continuously available within the handwriting input area; and a display area operable to display recognized text in a text recognition mode and handwritten input as digital ink, corresponding to the handwritten input entered in the handwriting input area without the requirement of converting the handwritten input to text using a recognition element, in an ink-only mode;

wherein a word separator is displayed in the handwritten input area to the right of words being entered, entries to the right of the word separator indicating start of a next word.

2. A method of providing written input to an electronic device, the method comprising:

receiving an entry from a written-entry screen area;

displaying a corresponding digital ink stroke in the written-entry screen area;

shifting each displayed digital ink stroke horizontally at a rate corresponding to an ink stroke rate of the digital ink, whereby written entries appear to be scrolling off one side of a display as on a ticker tape; and displaying the written entries in a display area, wherein displaying the written entries in the display area comprises:

passing the received entry to a handwriting recognition engine, the handwriting recognition engine converting the received entry to text, and displaying text in a textual display area in a text-recognition mode; and converting the written entries to digital ink and displaying the digital ink in the textual display area in an ink-only mode;

wherein shifting displayed digital ink strokes includes displaying a word separator indicating a point on the written-entry screen area designating demarcation between continuation of a current word and initiation of a next word.

3. A method as in claim 2, wherein the word separator scrolls with a written entry when written input is determined to have paused.

4. A method of providing written input to an electronic device, the method comprising:

receiving an entry from a written-entry screen area;

displaying a corresponding digital ink stroke in the written-entry screen area;

shifting each displayed digital ink stroke horizontally at a rate corresponding to an ink stroke rate of the digital ink, whereby written entries appear to be scrolling off one side of a display as on a ticker tape; and displaying the written entries in a display area, wherein displaying the written entries in the display area comprises:

passing the received entry to a handwriting recognition engine, the handwriting recognition engine converting the received entry to text, and displaying text in a textual display area in a text-recognition mode; and converting the written entries to digital ink and displaying the digital ink in the textual display area in an ink-only mode;

wherein a user can draw without having the input area scroll by:

entering a pause mode by pressing a user interface button, the pause mode operable to prevent an input screen from scrolling;

drawing within the input screen; and exiting pause mode whereby what was drawn is placed in the display area.

5. An electronic device for handwritten input and subsequent display of the handwritten input, the electronic device functionally comprising:

a user interface having an ink-text canvas and a conveyor canvas;

one or more ink-text areas coupled to the ink-text canvas;

a conveyor area coupled to the one or more ink-text areas and coupled to the user interface, the conveyor area comprising one or more ink traces;

an event loop of the user interface, the event loop operable to respond to pen-down events, pen-up events, pen-move events, and pen-timeout events, wherein upon an occurrence of a pen-timeout event in an ink-only mode, one or more ink traces are sent to an ink processor for display without converting the one or more ink traces to text using a recognition element;

wherein upon an occurrence of a pen-down event:

if a trace is already present and the trace has substantially fallen off an edge of the conveyor area, then sending the trace to the ink-text canvas for display, deleting the trace from the conveyor area, ensuring scrolling, cancelling any pending timeout events, and adding an ink point to the conveyor area;

if a trace is already present and the trace is not falling off an edge of the conveyor area, then ensuring scrolling, cancelling any pending timeout events, and adding an ink point to the conveyor area; and if a trace is not present, then ensuring scrolling, cancelling any pending timeout events, and adding an ink point to the conveyor area.

6. An electronic device for handwritten input and subsequent display of the handwritten input, the electronic device functionally comprising:

a user interface having an ink-text canvas and a conveyor canvas;

one or more ink-text areas coupled to the ink-text canvas;

a conveyor area coupled to the one or more ink-text areas and coupled to the user interface, the conveyor area comprising one or more ink traces;

an event loop of the user interface, the event loop operable to respond to pen-down events, pen-up events, pen-move events, and pen-timeout events, wherein upon an occurrence of a pen-timeout event in an ink-only mode, one or more ink traces are sent to an ink processor for display without converting the one or more ink traces to text using a recognition element;

wherein upon an occurrence of a pen-timeout event, any pending timeouts are canceled, one or more ink traces are sent to the ink processor for display, the one or more ink traces are deleted from the conveyor area, and scrolling of the conveyor area is stopped.

7. The electronic device of claim 6 wherein the ink processor displays the one or more ink traces in the ink-text canvas.

8. The electronic device of claim 6 wherein display of the one or more ink traces further comprises scaling and segmenting the handwritten input into lines so that it can be displayed vertically in the ink-text canvas.

* * * * *